US009483385B2

(12) United States Patent
Mizuno et al.

(10) Patent No.: US 9,483,385 B2
(45) Date of Patent: Nov. 1, 2016

(54) METHOD, PROGRAM, AND SYSTEM FOR GENERATING TEST CASES

(75) Inventors: Ken Mizuno, Kanagawa-ken (JP); Taiga Nakamura, Kanagawa-ken (JP); Hironori Takeuchi, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 792 days.

(21) Appl. No.: 13/409,236

(22) Filed: Mar. 1, 2012

(65) Prior Publication Data

US 2012/0226465 A1 Sep. 6, 2012

(30) Foreign Application Priority Data

Mar. 4, 2011 (JP) ................................. 2011-047829

(51) Int. Cl.
*G06F 11/263* (2006.01)
*G06F 11/36* (2006.01)

(52) U.S. Cl.
CPC ....... *G06F 11/3684* (2013.01); *G06F 11/3688* (2013.01); *G06F 11/3676* (2013.01)

(58) Field of Classification Search
CPC ............. G06F 11/263; G06F 11/3688; G06F 11/3684; G01R 31/2834
USPC ........................................................ 702/123
See application file for complete search history.

(56) References Cited

U.S. PATENT DOCUMENTS

| | | | |
|---|---|---|---|
| 6,577,982 B1 * | 6/2003 | Erb | 702/120 |
| 6,859,770 B2 * | 2/2005 | Ramsey | 703/16 |
| 2005/0261859 A1 * | 11/2005 | Petsinger | G06F 11/261 702/120 |
| 2009/0077538 A1 * | 3/2009 | Keyes | G06F 11/3684 717/124 |
| 2009/0172649 A1 * | 7/2009 | Teplitsky et al. | 717/143 |

FOREIGN PATENT DOCUMENTS

| | | |
|---|---|---|
| JP | H07200341 A | 8/1995 |
| JP | 2003256206 A | 9/2003 |
| JP | 2004192640 A | 7/2004 |
| JP | 2010532894 A | 7/2004 |

(Continued)

OTHER PUBLICATIONS

Cohen, et al., "The ATEG System: An Approach to Testing Based on Combinational Design." IEEE Transactions on Software Engineering, vol. 23, No. 7, pp. 437-444, Jul. 1997.
Jimbo, Toshihisa et al., "Fujitsu's Efforts for System Development Tests : Fujitsu Efficient Testing Framework" Fujitsu No. 2012-3, Fujitsu Limited, vol. 63, No. 2 141-145.

(Continued)

*Primary Examiner* — Mischita Henson
*Assistant Examiner* — Christine Liao
(74) *Attorney, Agent, or Firm* — Cantor Colburn LLP; David Quinn (57) ABSTRACT

To provide a technique for generating, at a high speed, a smaller-sized set that satisfies an intended property such as, for example, being pair-wise, and includes many test cases that match a set of existing test cases given as an input, candidates to be used from a set of existing input test cases are determined in the following manner: for some parameters, values to be held by test case candidates are determined; test cases having the determined values, among those included in the set of input test cases, are selected as the candidates. A test case having the highest score among one or more test case candidates generated with the method of the related art and one or more test case candidates selected from the set of input test cases is added to a set of output test cases.

6 Claims, 8 Drawing Sheets

(56) References Cited

FOREIGN PATENT DOCUMENTS

| | | |
|---|---|---|
| JP | 2006227958 A | 8/2006 |
| JP | 2007535723 A | 12/2007 |
| JP | 2009163609 A | 7/2009 |
| JP | 2009288831 A | 12/2009 |
| JP | 2011184996 A | 9/2011 |

OTHER PUBLICATIONS

Tsurumaki, Toshiro et al., "Automatic test case of yhe control path test by the Pairwise method and a restrictions table" SQiP Symposium 2009, Union of Japanese scientists and Engineers, retrieved at <URL>http://www.juse.jp/sqip/symposium/2009/day2/files/ippan_8-1.pdf.

\* cited by examiner

METHOD, PROGRAM, AND SYSTEM FOR GENERATING TEST CASES

CROSS-REFERENCE TO RELATED APPLICATION

This application claims priority under 35 U.S.C. §119 from Japanese Patent Application No. 2011-047289 filed Mar. 4, 2011, the entire contents of which are incorporated herein by reference.

BACKGROUND OF THE INVENTION

1. Field of the Invention

This invention relates to methods, programs, and systems for generating test cases for performing testing of computer systems or the like.

2. Description of Related Art

Computer systems and control apparatuses have various settable parameters, and behaviors thereof change depending on combinations of those parameters. For example, as parameters used in a computer system, there are the type of an operating system to be introduced, the type of a web browser to be used, the type of a network card, the capacities of a main memory and a hard disk, the type of a central processing unit (CPU), the number of cores thereof, and so forth.

Testing of such systems and apparatuses is desirably designed so that all combinations of parameters are covered. However, since the number of test cases exponentially increases against the number of parameters when all combinations of parameters are tested, such testing is not allowed in terms of processing time. Accordingly, methods for generating a set of test cases for performing efficient testing using fewer test cases have been hitherto proposed.

As one example, pair-wise testing, i.e., testing using pairs, is known. In pair-wise testing, a set of test cases is generated so that all possible pairs of values can be covered for given two parameters. Pair-wise testing is based on knowledge that many bugs are triggered by combinations of a few parameters.

For example, when there are n parameters serving as test items, $_nC_2$ cases are present for selecting two parameters from the n parameters in pair-wise testing. When there are $m_1$ and $m_2$ possible values for the two selected parameters $k_1$ and $k_2$, respectively, the number of pairs of values is equal to $_nC_2 \times m_1 \times m_2$.

Meanwhile, the following are known as patent literatures of the related art of this field.

Japanese Unexamined Patent Application Publication No. 2003-256206 discloses a method for assisting creation of a test plan. The method includes a step of setting quality information of each program module of a software system, a step of estimating first man-hours spent for detecting bugs of the program module from the quality information, a step of creating module-specification correspondence information representing a correspondence between the module and specifications extracted from a specification document of the software system, a step of estimating second man-hours for detecting bugs of the specifications from the first man-hours and the module-specification correspondence information, and a step of creating a test plan for distributing available test resources to tests of the software system based on the second man-hours.

Japanese Unexamined Patent Application Publication (Translation of PCT Application) No. 2007-535723 discloses a testing tool including an "automated multidimensional traceability matrix" system for determining linkages between interrelated system components, means for identifying a change in one or more of the interrelated system components, means for applying the "automated multidimensional traceability matrix", means for executing all of or a subset of test scenarios associated with the interrelated system components that may be affected by the change, and means for evaluating the results of the executed test scenarios.

Japanese Patent Application No. 2003-406478 discloses a method for monitoring a bus with pair-wise participants. The method includes detecting a problem during a transaction between first and second participants on the bus, and determining which participant is at fault for this problem or whether this problem includes a systemic bus problem.

Japanese Unexamined Patent Application Publication (Translation of PCT Application) No. 2010-532894 discloses a system and a method for assigning pieces of content to time-slot samples for measuring effects of the assigned content. By means of the system and the method, pair-wise content relatedness data is received that compares each of the pieces of content with the other pieces of content and identifies the piece of content as an experimental content piece or control content piece, and the experimental or control content pieces are algorithmically assigned to time-slot samples using the content relatedness data, and additional content pieces assigned to a particular time-slot sample exclude non-identical related experimental content pieces defined relative to experimental content pieces previously assigned to the particular time-slot sample.

As described above, in the related art, various practical-level testing methods including the pair-wise method are known.

Meanwhile, the inventors have encountered a situation where a set of test cases already exists before starting testing, such as the aforementioned one. The set of existing test cases includes test cases, validity of which has been already verified manually or in other ways. Accordingly, the inventors have considered that it might be advantageous if a reasonably sized set of test cases including this result can be acquired using the set of existing test cases.

However, the above-described testing methods of the related art do not suggest a technique for generating test cases using the set of existing test cases when the set of test cases is acquired.

SUMMARY OF THE INVENTION

An aspect of the present invention provides a computer-implemented method for generating test cases for a system having a plurality of parameters and one or more variable values assigned to each of the plurality of parameters, in accordance with combinations of the parameters and the variable values assigned to the parameters, the computer-implemented method including the steps of: holding a set of test cases including input test cases in storage means in a computer readable manner; executing a loop until the combinations of the parameters and the variable values are completed for all of the plurality of parameters, wherein the loop includes (i) generating the combinations of the parameters and the variable values so that the number of parameters storing variable values gradually increases, (ii) finding a test case that contains combinations of parameters and variable values partially matching the generated combinations of the parameters and the variables in the set of test cases including the input test cases, and storing the found test case in a set variable, and (iii) adding, in response to the set variable becoming an empty set, the test case that has been stored in the set variable in the last loop to a set of candidates; adding, in response to the combinations of the parameters and the variable values being completed for all of the plurality of parameters, a test case generated on the basis of the completed combinations of the parameters and the variables to the set of candidates; selecting, once the test cases for a plurality of different combinations of the parameters and the variable values are accumulated in the set of candidates, a test case from the set of candidates in accordance with the magnitude of a score related to a value including the number of cases that have not appeared, the score of the test case belonging to the set of test cases including the input test cases being calculated by increasing the score; and outputting the selected test case from the set of candidates.

Another aspect of the present invention provides a computer-executed program product for generating test cases for a system having a plurality of parameters and one or more variable values assigned to each of the plurality of parameters, in accordance with combinations of the parameters and the variable values assigned to the parameters, the computer-executed program product causing the computer to execute the steps of: holding a set of test cases including input test cases in storage means in a computer readable manner; executing a loop until the combinations of the parameters and the variable values are completed for all of the plurality of parameters, wherein the loop includes (i) generating the combinations of the parameters and the variable values so that the number of parameters storing variable values gradually increases, (ii) finding a test case that contains combinations of parameters and variable values partially matching the generated combinations of the parameters and the variables in the set of test cases including the input test cases, and storing the found test case in a set variable, and (iii) adding, in response to the set variable becoming an empty set, the test case that has been stored in the set variable in the last loop to a set of candidates; adding, in response to the combinations of the parameters and the variable values being completed for all of the plurality of parameters, a test case generated on the basis of the completed combinations of the parameters and the variables to the set of candidates; selecting, once the test cases for a plurality of different combinations of the parameters and the variable values are accumulated in the set of candidates, a test case from the set of candidates in accordance with the magnitude of a score related to a value including the number of cases that have not appeared, the score of the test case belonging to the set of test cases including the input test cases being calculated by increasing the score; and outputting the selected test case from the set of candidates.

Another aspect of the present invention provides a computer-implemented system having a plurality of parameters and one or more variable values assigned to each of the plurality of parameters and for generating test cases for the system in accordance with combinations of the parameters and the variable values assigned to the parameters, the computer-implemented system including: a test case holding unit to hold a set of test cases including input test cases in storage means in a computer readable manner; a loop executing unit to execute a loop until the combinations of the parameters and the variable values are completed for all of the plurality of parameters, wherein the loop includes (i) generating the combinations of the parameters and the variable values so that the number of parameters storing variable values gradually increases, (ii) finding a test case that contains combinations of parameters and variable values partially matching the generated combinations of the parameters and the variables in the set of test cases including the input test cases, and storing the found test case in a set variable, and (iii) adding, in response to the set variable becoming an empty set, the test case that has been stored in the set variable in the last loop to a set of candidates; a test case adding unit to add, in response to the combinations of the parameters and the variable values being completed for all of the plurality of parameters, a test case generated on the basis of the completed combinations of the parameters and the variables to the set of candidates; a test case selecting unit to select, once the test cases for a plurality of different combinations of the parameters and the variable values are accumulated in the set of candidates, a test case from the set of candidates in accordance with the magnitude of a score related to a value including the number of cases that have not appeared, the score of the test case belonging to the set of test cases including the input test cases being calculated by increasing the score; and a test case output unit to output the selected test case from the set of candidates.

Another aspect of the present invention provides a computer-implemented method for generating test cases for a system having a plurality of parameters and one or more variable values assigned to each of the plurality of parameters, in accordance with combinations of the parameters and the variable values assigned to the parameters, the computer-implemented method including the steps of: holding a set of test cases including input test cases in storage means in a computer readable manner; generating the combinations of the parameters and the variable values; finding a test case that contains the combinations of the parameters and the variable values in the set of test cases including the input test cases, and storing the found test case in a set variable; adding a test case generated on the basis of the combinations of the parameters and the variables to a set of candidates; selecting, once the test cases for a plurality of different combinations of the parameters and the variable values are accumulated in the set of candidates, a test case from the set of candidates in accordance with the magnitude of a score related to a value including the number of cases that have not appeared, the score of the test case belonging to the set of test cases including the input test cases being calculated by increasing the score; and outputting the selected test case from the set of candidates.

Another aspect of the present invention provides a computer-executed program product for generating test cases for a system having a plurality of parameters and one or more variable values assigned to each of the plurality of parameters, in accordance with combinations of the parameters and the variable values assigned to the parameters, the computer-executed program product causing the computer to execute a process including the steps of: holding a set of test cases including input test cases in storage means in a computer readable manner; generating the combinations of the parameters and the variable values; finding a test case that contains the combinations of the parameters and the variable values in the set of test cases including the input test cases, and storing the found test case in a set variable; adding a test case generated on the basis of the combinations of the parameters and the variables to a set of candidates; selecting, once the test cases for a plurality of different combinations of the parameters and the variable values are accumulated in the set of candidates, a test case from the set of candidates in accordance with the magnitude of a score related to a value including the number of cases that have not appeared, the score of the test case belonging to the set of test cases including the input test cases being calculated by increasing the score; and outputting the selected test case from the set of candidates.

BRIEF DESCRIPTION OF THE DRAWINGS

In order to describe features and benefits of the embodiment of the invention in detail, the following drawings will be referred to. Where possible, same or similar reference number will be used in drawings and description to denote same or similar part, in which.

DETAILED DESCRIPTION OF THE PREFERRED EMBODIMENTS

An embodiment of this invention will be described below based on the drawings. Like reference numerals designate similar subjects throughout the drawings unless otherwise noted. Additionally, it should be understood that an embodiment to be described below is merely one embodiment of the present invention and there is no intention to limit this invention to content described in this embodiment.

It is an object of the present invention to provide a technique for generating, at a high speed, a smaller-sized set that satisfies an intended property such as, for example, being pair-wise, and includes many test cases that match a set of existing test cases given as an input.

Methods are already known in which test cases are sequentially generated and added to a set of output test cases until the set of output test cases satisfies the intended property. Accordingly, a system according to the present invention generates a small-sized set of output test cases including many test cases that match a set of existing input test cases by using test cases included in the set of existing input test cases as candidates in addition to test cases generated with a method of the related art.

In the present invention, candidates to be used from the set of input test cases are determined in the following manner:

For some parameters, values to be held by test case candidates are determined.

Test cases having the determined values, among those included in the set of input test cases, are selected as the candidates.

A test case having the highest score among one or more test case candidates generated with the method of the related art and one or more test case candidates selected from the set of input test cases is added to the set of output test cases. The processing is repeated until the set of output test cases satisfies the intended property. Here, the score of the test case is, for example, the number of pairs that have not appeared among pairs of parameters and variables included the test case in the pair-wise method. This score is referred to as a score in the method of the related art.

In the system according to the present invention, the score is calculated in the following manner:

The score in the method of the related art is used for test case candidates generated with the method of the related art.

A value obtained by multiplying the score in the method of the related art by a constant greater than one is used for test case candidates selected from the set of input test cases.

If the constant becomes greater at this time, the set of output test cases includes more test cases that match the set of existing input test cases. However, the size of the set of output test cases may become larger and, thus, the value of the constant has to be reasonably selected.

According to this invention, it is possible to generate a set of test cases having a size that is made as small as possible at high speed while maintaining as much consistency with the set of existing input test cases as possible by including data of the set of existing input test case.

Figure 1:
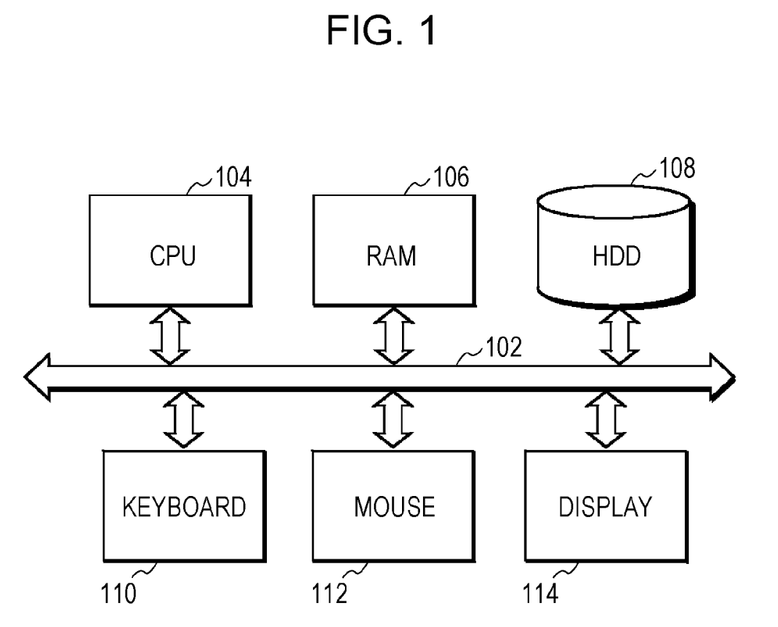
FIG. 1 is a block diagram of an example of a hardware configuration for carrying out the present invention.

FIG. 1 illustrates a block diagram of computer hardware for realizing configurations and processes of a system according to an embodiment of the present invention. In FIG. 1, a central processing unit (CPU) 104, a main memory (random access memory (RAM)) 106, a hard disk drive (HDD) 108, a keyboard 110, a mouse 112, and a display 114 are connected to a system bus 102. The CPU 104 is preferably based on the 32-bit or 64-bit architecture. For example, Pentium (trademark) 4, Core (trademark) 2 Duo, or Xeon (trademark) of Intel Corporation, Athlon of AMD, or the like can be used. The main memory 106 preferably has a capacity of 4 GB or larger. The HDD 108 desirably has, for example, a capacity of 500 GB or larger so that a large amount of data can be stored therein.

Although not illustrated individually, an operating system is pre-stored in the HDD 108. Any given operating system compatible with the CPU 104, such as Linux (trademark), Windows XP (trademark) or Windows (trademark) 7 of Microsoft Corporation, or Mac OS (trademark) of Apple Inc., may be used.

The HDD 108 further stores a set of input test results, a set of parameters to be combined for testing, processing routines for the processes of the present invention, and so forth. Details about these parameters and processing routines are described later with reference to FIG. 5.

The keyboard 110 and the mouse 112 are used for starting the operating system or programs (not illustrated) loaded from the HDD 108 to the main memory 106 and displayed on the display 114, or for entering characters.

The display 114 is preferably a liquid crystal display. For example, a display having a given resolution, such as XGA (a resolution of 1024×768) or UXGA (a resolution of 1600×1200), can be used. Although not illustrated, the display 114 is used for displaying operation windows for starting the processes of the present invention, test results, and so forth.

Before describing the processes of the present invention, a greedy algorithm hitherto known as a method for automatically generating pair-wise test cases will be described with reference to flowcharts of FIG. 2 to FIG. 4 in order to help understanding of the processes of the present invention. Thereafter, the processes of the present invention will be described as improvements of this greedy algorithm.

Figure 2:
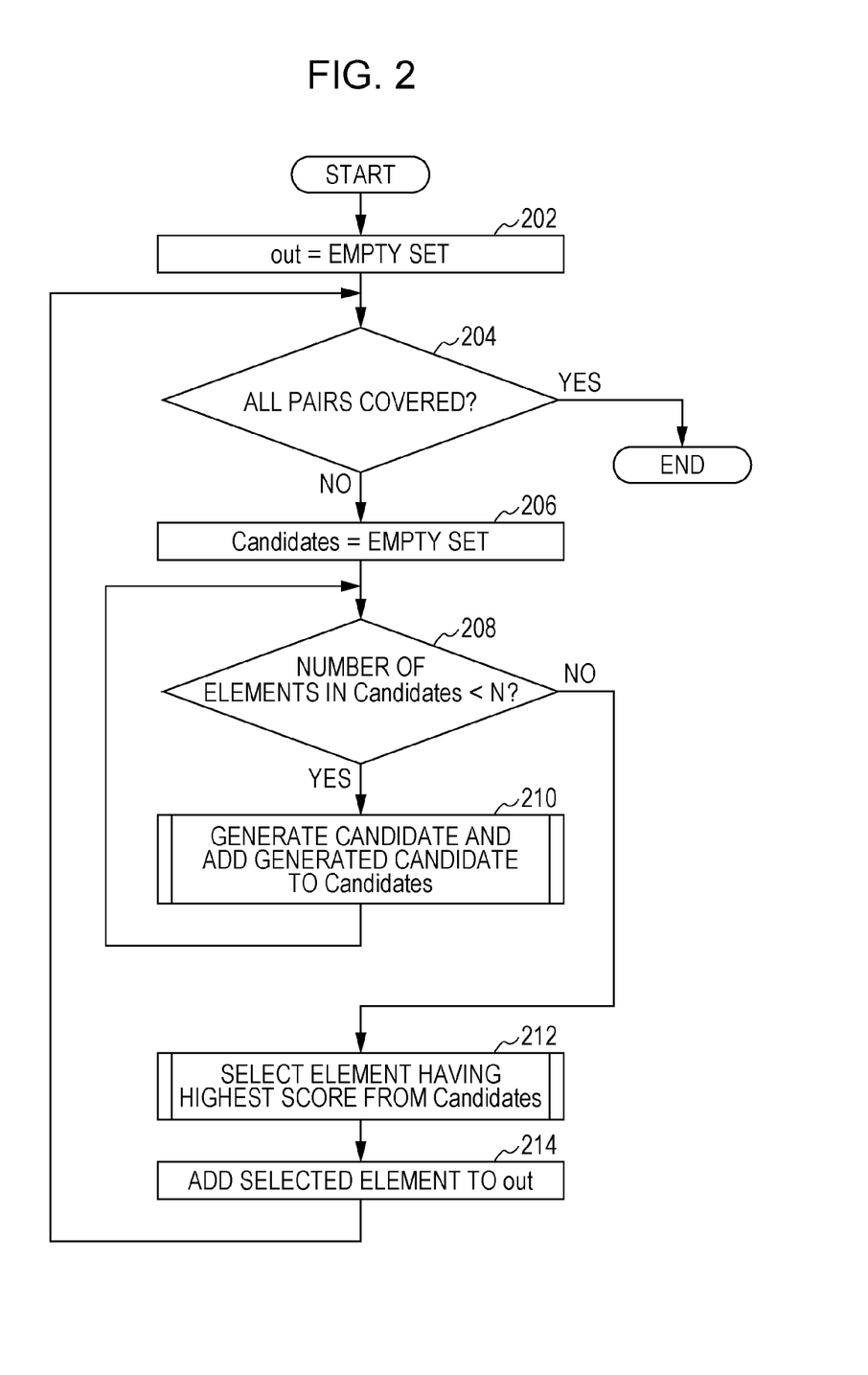
FIG. 2 is a diagram illustrating a flowchart of a typical process of generating test cases of the related art.

FIG. 2 is a flowchart of a main process of a greedy pair-wise testing algorithm of the related art. In step 202 of FIG. 2, an empty set is set into a set variable "out".

In step 204, whether the "out" has covered all pairs of pair-wise test parameters is determined.

If not, the process proceeds to step 206, in which an empty set is set into a set variable "Candidates".

In step 208, whether the number of elements in the "Candidates" is less than N is determined. If so, one candidate is generated and added to the "Candidates" in step 210. The process in step 210 will be described in more detail later with reference to the flowchart of FIG. 3.

If the number of elements in the "Candidates" reaches N after repetition of the loop of step 208 and step 210, the process proceeds to step 212 from step 208. In step 212, a candidate having the highest score is selected from the "Candidates". Here, the score indicates a score of a test case and is, for example, the number of newly covered pairs among pairs covered by the test case, i.e., the number of pairs that have not been covered by the hitherto generated test cases. The process in step 212 will be described in more detail later with reference to the flowchart of FIG. 4.

In step 214, the candidate selected in step 212 is added to the "out". The process then returns to step 204.

While repeating the processing from step 204 to step 214, candidates are accumulated in the "out". If it is determined that all pairs have been covered in step 204, the process ends. The candidates accumulated in the "out" in this manner are used.

Next, the process of generating a candidate and adding the candidate to the "Candidates" performed in step 210 will be described with reference to the flowchart of FIG. 3.

Figure 3:
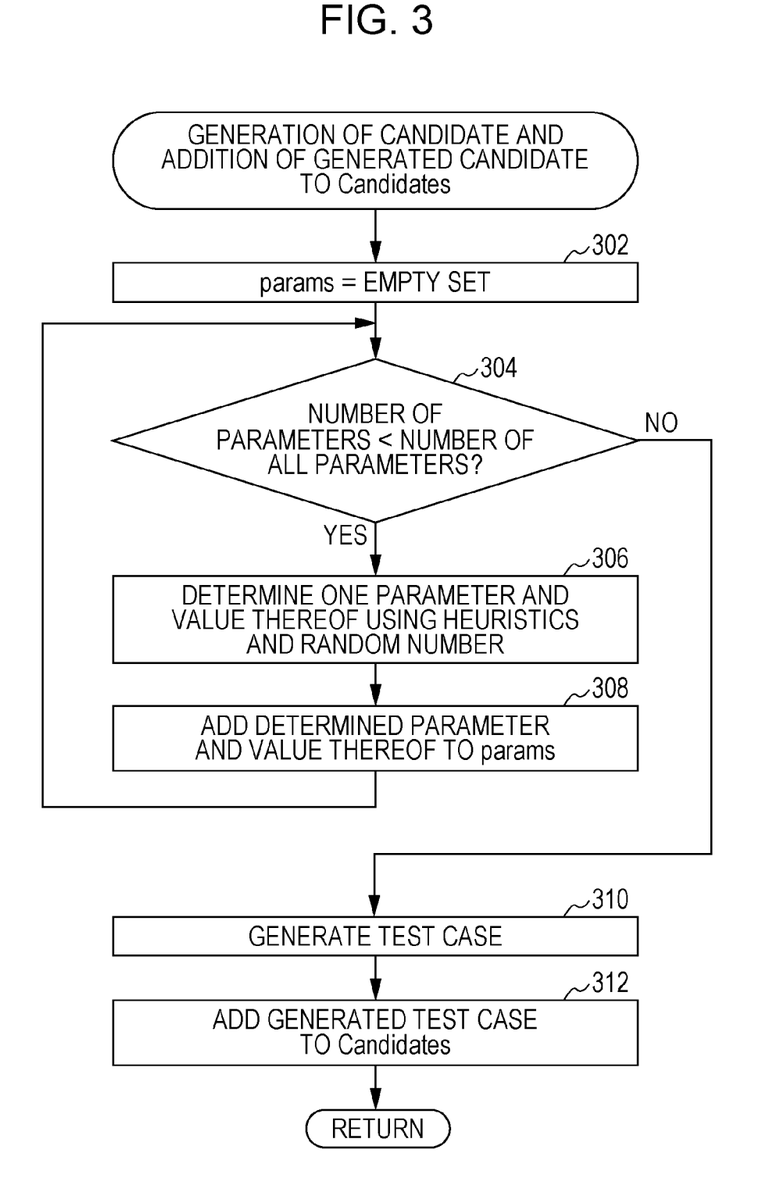
FIG. 3 is a diagram illustrating a flowchart of a process of generating and adding candidates in a method of the related art.

In step 302 of FIG. 3, an empty set is set into a set variable "params". In step 304, whether the number of parameters in the "params" is less than the number of all parameters is determined. If so, the process proceeds to step 306, and one parameter and a value thereof are determined using heuristics and a random number. In step 308, the determined parameter and the value thereof are added to the "params". The process then returns to the determination in step 304.

If the determination in step 304 indicates NO after the processing from step 304 to step 308, all parameters have been covered. Accordingly, the process proceeds to step 310, in which a test case is generated using the set parameters, i.e., combinations included in the "params". In step 312, the generated test case is added to the "Candidates". The process then returns.

Next, the process of selecting a test case having the highest score from test cases included in the "Candidates" performed in step 212 will be described with reference to the flowchart of FIG. 4.

In step 402, "−∞" is set, as a negative value having a sufficiently large absolute value, into a variable "score".

Processing from step 404 to step 412 is sequentially performed for all elements c, i.e., test cases, included in the "Candidates".

In step 406, whether a score of the "c" is greater than the "score" is determined. Here, the score indicates the number of newly covered pairs generated based on the test case.

If the score of the "c" is greater than the "score", the score of the "c" is set into the "score" in step 408. In step 410, the "c" is stored in a variable "ret".

If the score of the "c" is not greater than the "score", step 408 and step 410 are simply skipped. After the processing from step 404 to step 412 is completed for all elements "c" of the "Candidates" in this way, the process returns the "ret" and the process of the flowchart of FIG. 4 ends.

Based on the above description, the description of the present invention will be given. First, processing routines and so forth for executing the present invention will be described with reference to a block diagram of a functional configuration illustrated in FIG. 5. These processing routines are previously created using an existing programming language, such as C, C++, or Java (registered trademark), stored in the HDD 108 in an executable format, and loaded to the main memory 106 and executed by operations of the operating system.

Figure 5:
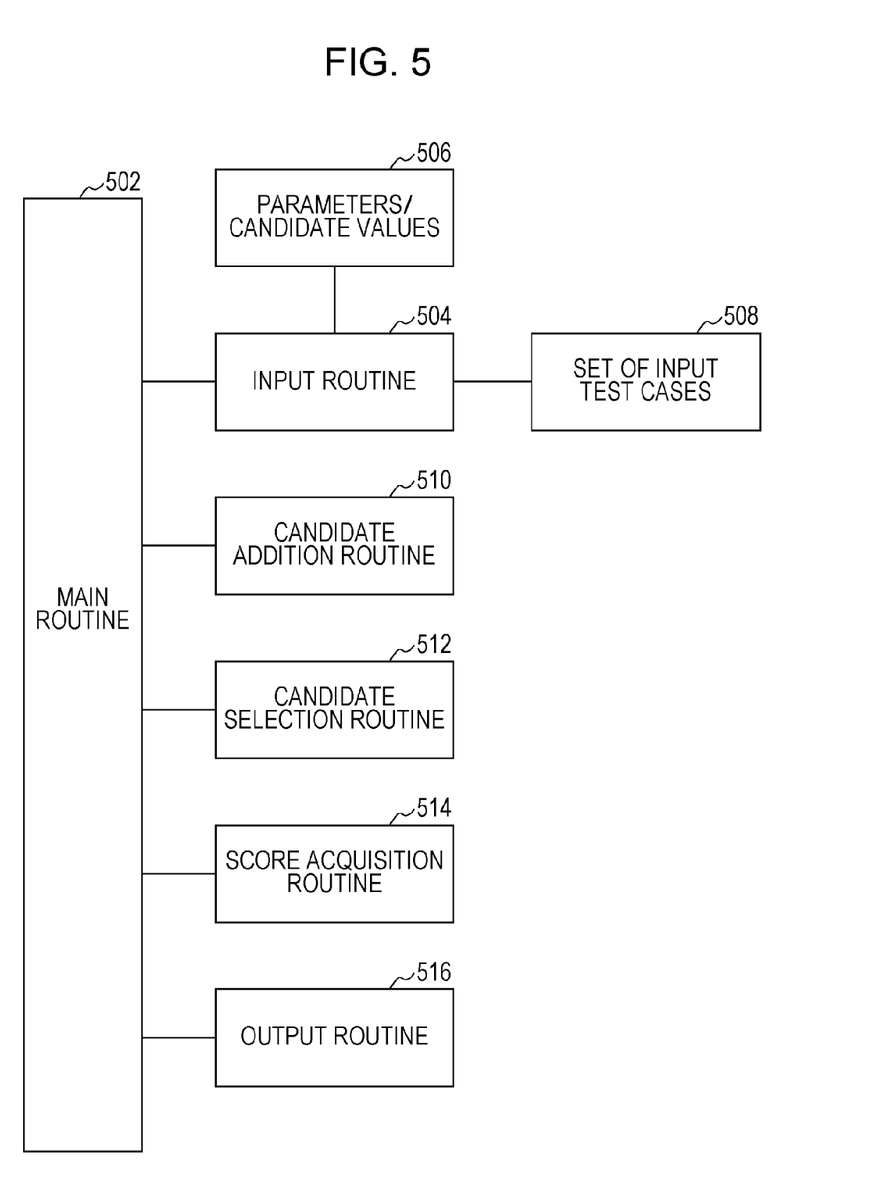
FIG. 5 is a block diagram of a functional configuration for carrying out the present invention.

In FIG. 5, a main routine 502 is a program for integrating the entire operations of the present invention and has functions for displaying operation windows on the display 114 and for receiving user operations and starting processes, not illustrated.

An input routine 504 has a function for appropriately reading data from a file 506 containing test parameters/candidate values and a file 508 containing a set of input test cases stored in the HDD 108, in accordance with instructions given from the main routine 502.

Here, the test parameters/candidate values are, for example, the following: (Although the actual case includes more parameters, the description will be given for a simple case for convenience.)

OS = {Windows XP, 2003 Server, AIX, Linux}
Browser = {Firefox, IE, Opera}
Level = {L1, L2, L3, L4}
Restriction = {true, false}

Additionally, elements, i.e., test cases, of the set of input test cases are for example the following ones, in each of which one variable value serving as the candidate value is assigned to each parameter.

Test Case 1:

OS => Windows XP
Browser => IE
Level => L1
Restriction => true

Test Case 2:

OS => AIX
Browser => Firefox
Level => L1
Restriction => false

Test Case 3:

OS => Linux
Browser => IE
Level => L3
Restriction => false

Although a candidate addition routine 510 executes the process corresponding to the flowchart of FIG. 3 described as the related art, part of the process is modified according to the present invention. The candidate addition routine 510 will be described later with reference to a flowchart of FIG. 7.

Figure 4:
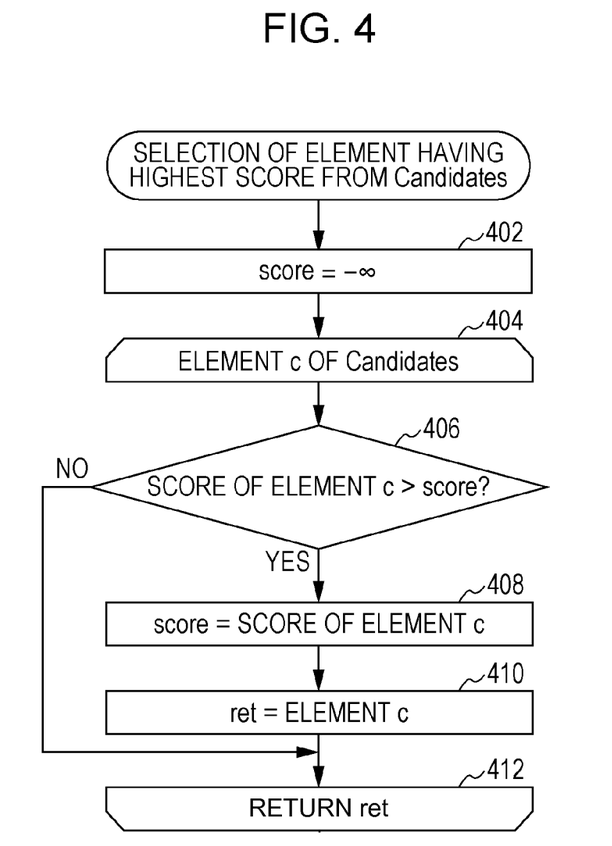
FIG. 4 is a diagram illustrating a flowchart of a process of selecting a candidate having the highest score from candidates in the method of the related art.

Although a candidate selection routine 512 executes the process corresponding to the flowchart of FIG. 4 described as the related art, the process of acquiring the score of the element "c" of the "Candidates" is modified according to the present invention.

A score acquisition routine 514 executes the process of acquiring the score, which is called by the candidate selection routine 512, and will be described later with reference to a flowchart of FIG. 8.

An output routine 516 writes, preferably as a file, a set of resulting test cases in the HDD 108.

Figure 6:
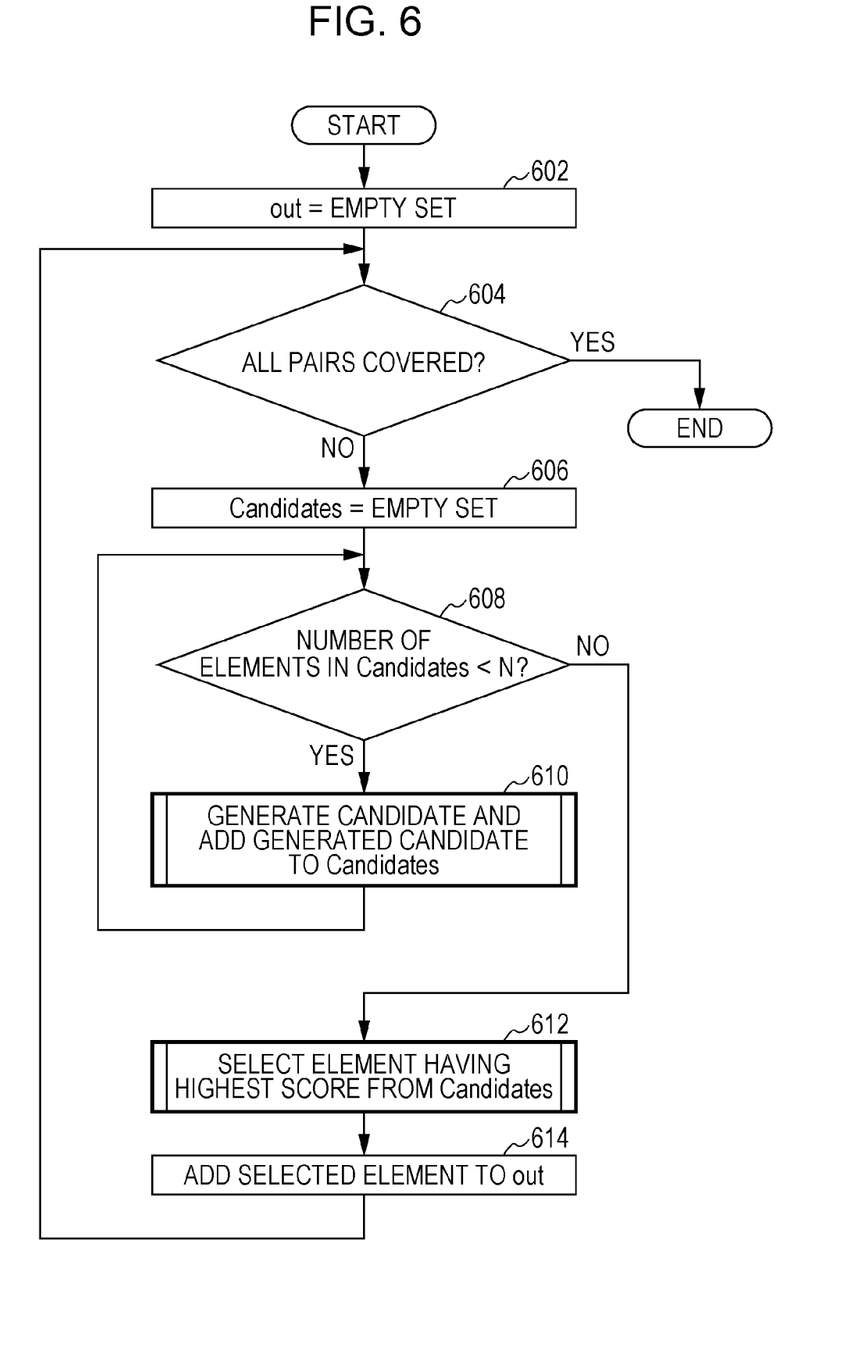
FIG. 6 is a diagram illustrating a flowchart of an overall process of the present invention.

Next, the process of the main routine 502 will be described with reference to the flowchart of FIG. 6. The process of a flowchart of FIG. 6 is obtained by modifying part of the process of the flowchart of FIG. 2 of the related art, and will be described based on the flowchart of FIG. 6. Meanwhile, in FIG. 6, step 610 and step 612 enclosed by thick lines particularly indicate differences from the flowchart of FIG. 2 of the related art.

In FIG. 6, the main routine 502 sets an empty set into a set variable "out" in step 602.

In step 604, the main routine 502 determines whether the "out" has covered all pairs of pair-wise test parameters. This determination is achieved by previously preparing a set variable including all pairs using a computer system and eliminating elements corresponding to pairs generated based on a selected test case from the prepared set in step 614. According to such processing, the determination in step 604 is performed such that it is determined that all pairs have been covered based on the fact that the prepared set becomes an empty set.

If not, the process proceeds to step 606, in which the main routine 502 sets an empty set into a set variable "Candidates".

In step 608, the main routine 502 determines whether the number of elements in the "Candidates" is less than N. If so, the main routine 502 generates one candidate and adds the candidate to the "Candidates" in step 610. The process in step 610 is executed by calling the candidate addition routine 510. The candidate addition routine 510 will be described in more detail later with reference to the flowchart of FIG. 7. Step 610 corresponds to step 210 of FIG. 2. Step 612 differs from step 212 in that a test case included in the set 508 of input test cases is considered and is selected in accordance with a condition.

If the number of elements in the "Candidates" reaches N after repetition of the loop of step 608 and step 610, the process proceeds to step 612 from step 608. In step 612, a candidate having the highest score is selected from the "Candidates". Here, the score is calculated based upon the number of newly covered pairs by the score acquisition routine 514. The process in step 612 is performed by calling the candidate selection routine 512. The processing content of the candidate selection routine 512 is substantially the same as that described in the flowchart of FIG. 4 but the process of acquiring the score of the test case, i.e., the element "c" of the "Candidates", is different from that in step 406 of the flowchart of FIG. 4.

Figure 8:
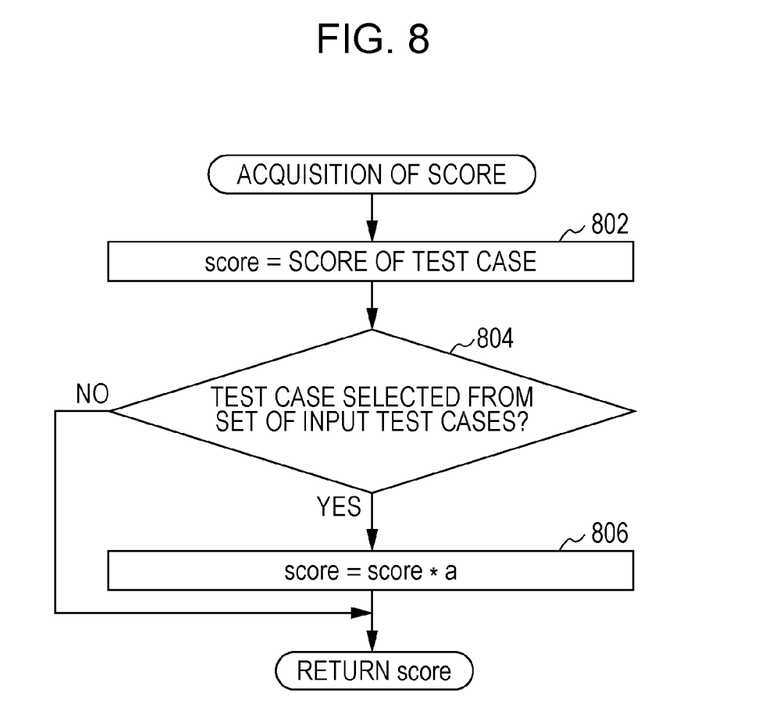
FIG. 8 is a diagram illustrating a flowchart of a process of acquiring a score of a test case in the present invention.

As described above, the process of acquiring the score is executed by the score acquisition routine 514 illustrated in the flowchart of FIG. 8 in the present invention. Specifically, in FIG. 8, the score acquisition routine 514 acquires, as a value of the score, the number of newly covered pairs generated based on the test case, and stores the acquired value in a variable "score" in step 802. In step 804, the score acquisition routine 514 determines whether the test case is acquired from the set 508 of input test cases. If so, the score acquisition routine 514 multiplies the "score" by a constant "a" (a>1) to increase the value of the "score". If the test case is not acquired from the set 508 of input test cases, the value of the "score" is kept as it is. By increasing the value of the "score" in this way when the test case is acquired from the set 508 of input test cases, the test case acquired from the set 508 of input test cases is more likely to survive in the process of selecting the test case having the highest score illustrated in the flowchart of FIG. 4.

In step 614, the main routine 502 adds the candidate selected in step 612 to the "out". Furthermore, the main routine 502 eliminates, from the set variable for use in the determination in step 604, the pairs generated from the test case added to the "out". The process then returns to step 604. Meanwhile, it is assumed here that the following test case is added to the "out":

OS => AIX
Browser => Firefox
Level => L1
Restriction => false

In this case, the following six pairs are used for eliminating the corresponding elements from the set variable based on this test case:

- OS=AIX, Browser=Firefox
- OS=AIX, Level=L1
- OS=AIX, Restriction=false
- Browser=Firefox, Level=L1
- Browser=Firefox, Restriction=false
- Level=L1, Restriction=false While repeating processing from step 604 to step 614, candidates are accumulated in the "out". If the not-yet-selected pair no longer exists in step 604, the determination in step 604 indicates NO and the process ends. The candidates accumulated in the "out" at last in this manner are used.

Next, the process of the candidate addition routine 510 corresponding to step 610 of FIG. 6 will be described with reference to the flowchart of FIG. 7.

Figure 7:
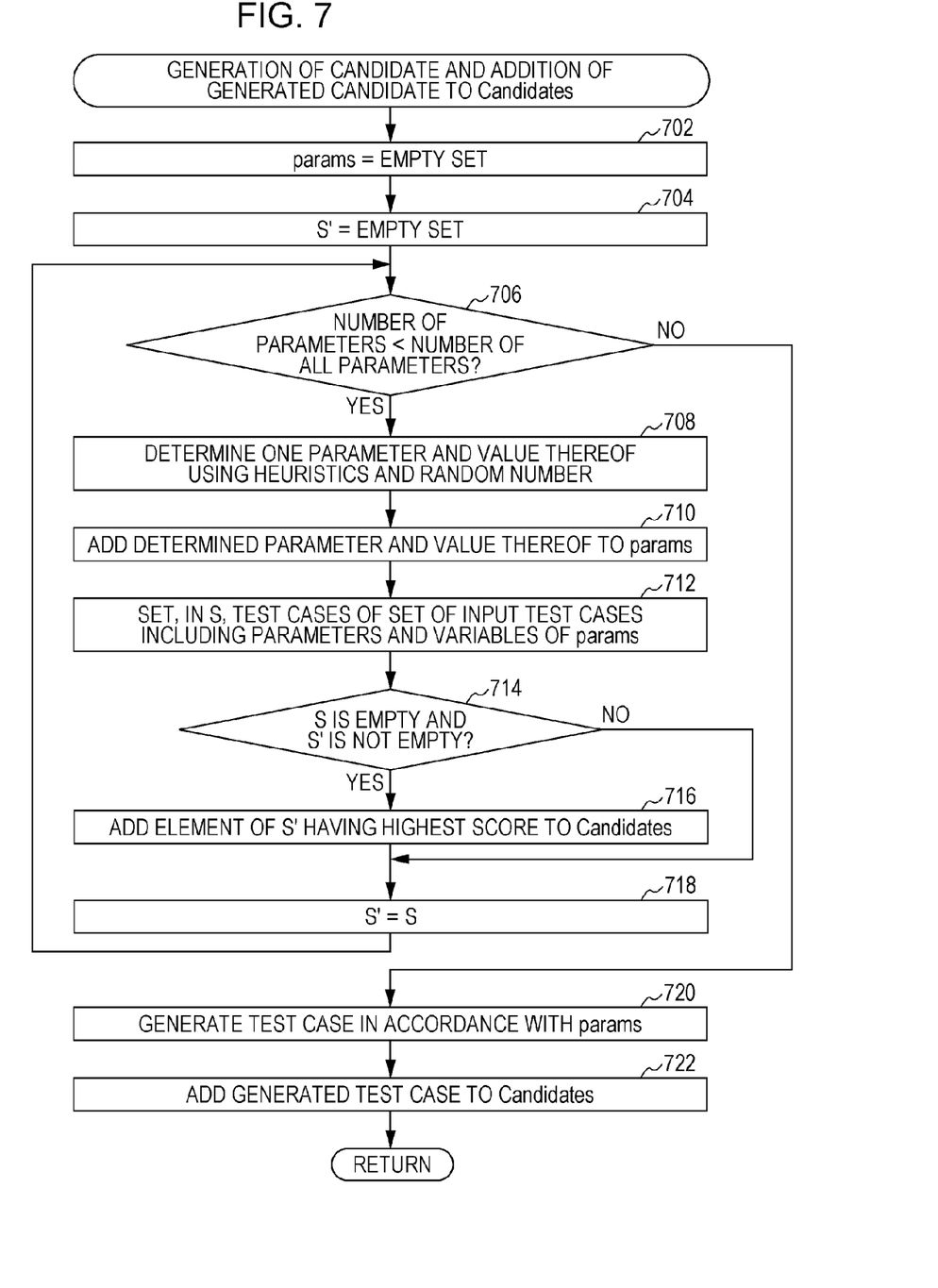
FIG. 7 is a diagram illustrating a flowchart of a process of generating and adding candidates in the present invention.

In step 702 of FIG. 7, the candidate addition routine 510 sets an empty set into a set variable "params". In step 704, the candidate addition routine 510 sets an empty set into a set variable "S".

In step 706, the candidate addition routine 510 determines whether the number of parameters in the "params" is less than the number of all parameters. If so, the process proceeds to step 708, in which the candidate addition routine 510 determines one parameter and a value thereof using heuristics and a random number. In next step 710, the candidate addition routine 510 adds the determined parameter and the value thereof to the "params". Specifically, data such as "OS=Windows XP" is added to the "params".

Here, the heuristics is, for example, for allowing the generated test case to be more likely to satisfy the intended property (for making the score higher) and, for example, the followings can be considered for pair-wise testing:

Select a parameter and a value thereof that most frequently appear in pairs that have not been covered by test cases ("out") that have been generated up to that point.

Select a parameter and a value thereof that give the largest number of pairs that have not been covered by the "out" among pairs created when the selected parameter and the value thereof are combined with already selected parameters and values thereof ("params").

For example, suppose that the following pairs exist as the not-yet-covered pairs:

- OS=Windows XP, Browser=Firefox
- OS=Windows XP, Network=modem
- OS=Windows XP, Level=L1
- OS=AIX, Level=L2
- Browser=IE, Level=L2

In this case, if the "params" is empty, "OS=Windows XP" is selected in accordance with the first heuristics (since "OS=Windows XP" is included in the first three pairs).

If the "params" includes {OS=AIX, Browser=IE}, "Level=L2" is selected in accordance with the second heuristics (since the combination of "Level=L2" and the "params" newly covers the last two pairs). In addition to the heuristics, a random number is also appropriately used in determination of the variables.

In step 712, the candidate addition routine 510 sets, into a set variable "S", test cases of the set of input test cases that include the parameters and the variables set in the "params". When all parameters are not covered by the parameters in the "params", a test case of the set of input test cases that partially matches the variables set for the parameters is selected.

For example, suppose that there are four parameters, i.e., OS, Browser, Level, and Restriction, for simplification, and the "params" includes {OS=Windows XP} and {Browser=Opera}. In this case, a test case of the set of input test cases that has combinations of parameters and variables that match the current combinations of parameters and variables is selected.

After the test case is set into the set variable "S" from the set of input test cases in this way, the candidate addition routine 510 determines whether the "S" is empty and the "S'" is not empty in step 714. In the first loop from step 706 to step 718, the empty set is set into the "S'" in step 704 and, thus, the determination in step 714 indicates NO. Since "S'=S" is set in step 718, there may be a case where the "S" is empty and the "S'" is not empty in the second and following loops from step 706 to step 718. In such a case, the determination in step 714 indicates YES and the process proceeds to step 716. At this time, the "S'" stores the test case that has been selected from the set of test cases immediately before the test case including the parameters and the variables set in the "params" no longer exists in the set of input test cases.

The candidate addition routine 510 then adds the test case having the highest score in the "S'" to the "Candidates" in step 716. This corresponds to a process executed by replacing the "Candidates" with the "S'" in the process of the flowchart of FIG. 4.

Here, the description regarding the score of a test case will be additionally given. For example, the test case 1 described before is again referred to here:

OS => Windows XP
Browser => IE
Level = L1
Restriction => true

The following six pairs are acquired by combining parameters of this test case:

- OS=Windows XP, Browser=IE
- OS=Windows XP, Level=L1
- OS=Windows XP, Restriction=true
- Browser=IE, Level=L1
- Browser=IE, Restriction=true
- Level=L1, Restriction=true The pairs obtained in this way are classified into pairs that have already appeared and pairs that have not yet appeared. At this time, the number of not-yet-appeared pairs is referred to as the score. Determination about whether a pair has already appeared can be made by using the set of pairs mentioned regarding step 604, for example. Specifically, if a pair is still included in this set, this indicates that the pair has not yet appeared. On the other hand, if a pair is not found in this set, this indicates that the pair has already appeared and eliminated from this set.

After "S'=S" is set in step 718 in this way, the process returns to the determination in step 706. If the candidate addition routine 510 determines that the number of parameters in the "params" has reached the number of all parameters, the candidate addition routine 510 generates a test case in accordance with the "params" in step 720, and adds the generated test case to the "Candidates" in step 722. The process then proceeds to step 612 of the flowchart of FIG. 6.

The process of the candidate addition routine 510 illustrated in the flowchart of FIG. 7 is summarized as follows. In step 716, a test case is added to the "Candidates" from the set of input test cases. Additionally, in step 722, a test case generated in accordance with the parameters and the values thereof included in the "params" is added to the "Candidates". That is, when the process proceeds to step 612, the "Candidates" includes both the test cases added from the set of input test cases and the test cases generated in accordance with the parameters and the values of the "params".

The test cases serving as elements of the set "Candidates" are selected using the score in step 612. At that time, as is seen from the flowchart of FIG. 8, the score is manipulated so that the score of the test case added from the set of input test cases becomes higher than the score of the generated test case. Accordingly, the test case added from the set of input test cases is more preferentially output by the output routine 516 than in the case without such manipulation.

Although the pair-wise method is used as the method for generating combinations of parameters of a test case in the above-described embodiment, the present invention is not limited to this method and can adopt any given known combinational testing techniques. For example, a triplet of a parameter and variables may be used instead of a pair of a parameter and a variable.

Furthermore, those skilled in the art would understand that the present invention is not limited to specific hardware or software of a computer and can be carried out on a given platform regardless of whether the platform is standalone or in a network environment.

The invention claimed is:

1. A computer-implemented method for generating test cases for a system having a plurality of parameters and one or more variable values assigned to each of the plurality of parameters, in accordance with combinations of the parameters and the variable values assigned to the parameters, the computer-implemented method comprises the steps of:

holding a set of test cases, in a storage, including existing input test cases in a non-transitory computer readable manner, wherein a validity of each of the existing input test cases has previously been verified;

executing, by a processor, a loop until the combinations of the parameters and the variable values are completed for all of the plurality of parameters, wherein the loop comprises:
  (i) generating the combinations of the parameters and the variable values so that the number of parameters storing variable values gradually increases,
  (ii) finding a test case that contains combinations of parameters and variable values partially matching the generated combinations of the parameters and the variables in the set of test cases including the existing input test cases, and storing the found test case in a set variable, and
  (iii) adding, in response to the set variable becoming an empty set, the test case that has been stored in the set variable in the last loop to a set of candidates;

adding, by a processor, in response to the combinations of the parameters and the variable values being completed for all of the plurality of parameters, a test case generated on the basis of the completed combinations of the parameters and the variables to the set of candidates;

selecting, by a processor, once the test cases for a plurality of different combinations of the parameters and the variable values are accumulated in the set of candidates, a test case from the set of candidates in accordance with the magnitude of a score related to a value including the number of cases that have not appeared, determining that the selected test case is an existing input test case from the set of test cases and calculating the score of the selected test case by increasing the score of the selected test case by multiplying the score by a value greater than one;

otherwise, determining that the selected test case is not an existing input test case from the set of test cases and calculating the score for the selected test case without multiplying the score by any value;

outputting, by a processor, the selected test case from the set of candidates; and testing the system by performing the selected test case by the system.

2. The computer-implemented method according to claim 1, wherein the plurality of different combinations of the parameters and the variable values are generated by using a pair-wise method.

3. The computer-implemented method according to claim 2, wherein the score of the test case is determined by the number of pairs that have not appeared among pairs covered by the test case.

4. A computer-implemented method for generating test cases for a system having a plurality of parameters and one or more variable values assigned to each of the plurality of parameters, in accordance with combinations of the parameters and the variable values assigned to the parameters, the computer-implemented method comprising the steps of:

holding, in a storage, a set of test cases including existing input test cases in a non-transitory computer readable manner, wherein a validity of each of the existing input test cases has previously been verified;

generating, by a processor, the combinations of the parameters and the variable values;

finding, by a processor, a test case that contains the combinations of the parameters and the variable values in the set of test cases including the existing input test cases, and storing the found test case in a set variable;

adding, by a processor, a test case generated on the basis of the combinations of the parameters and the variables to a set of candidates;

selecting, by a processor, once the test cases for a plurality of different combinations of the parameters and the variable values are accumulated in the set of candidates, a test case from the set of candidates in accordance with the magnitude of a score related to a value including the number of cases that have not appeared, determining that the selected test case is an existing input test case from the set of test cases and calculating the score of the selected test case by increasing the score of the selected test case by multiplying the score by a value greater than one;

otherwise, determining that the selected test case is not an existing input test case from the set of test cases and calculating the score for the selected test case without multiplying the score by any value;

outputting, by a processor, the selected test case from the set of candidates; and testing the system by performing the selected test case by the system.

5. The computer-implemented method according to claim 4, wherein the plurality of different combinations of the parameters and the variable values are generated by using a pair-wise method.

6. The computer-implemented method according to claim 5, wherein the score of the test case is determined by the number of pairs that have not appeared among pairs covered by the test case.

* * * * *